United States Patent [19]

Gaon et al.

[11] Patent Number: 5,180,601
[45] Date of Patent: Jan. 19, 1993

[54] PROCESS FOR PREPARING FAT FREE SNACK CHIPS

[75] Inventors: David Gaon, San Jose, Calif.; John Wiedersatz, Jeffersonville, Ind.

[73] Assignee: TGTBT, Ltd., Santa Barbara, Calif.

[21] Appl. No.: 712,196

[22] Filed: Jun. 7, 1991

[51] Int. Cl.$^5$ ............................ A23L 1/00; H05B 6/00
[52] U.S. Cl. .................................. 426/242; 426/243; 426/804; 426/808
[58] Field of Search .............. 426/242, 243, 804, 808, 426/637

[56] References Cited

U.S. PATENT DOCUMENTS

| | | | |
|---|---|---|---|
| 3,365,301 | 1/1968 | Lipoma et al. | 426/242 |
| 3,502,479 | 3/1970 | Singer et al. | 426/242 |
| 3,710,064 | 1/1973 | Mathur | 219/10.55 A |
| 3,989,849 | 11/1976 | Fogel et al. | 426/242 |
| 4,149,322 | 4/1979 | Minoda | 219/10.55 A |
| 4,283,425 | 8/1981 | Yuan et al. | 426/102 |
| 4,800,090 | 1/1989 | August | 426/243 |
| 4,906,483 | 3/1990 | Kloos | 426/243 |
| 4,933,194 | 6/1990 | Barry et al. | 426/144 |
| 4,933,199 | 6/1990 | Neel et al. | 426/438 |

FOREIGN PATENT DOCUMENTS

| | | | |
|---|---|---|---|
| 1151945 | 8/1983 | Canada | 426/243 |

*Primary Examiner*—George Yeung
*Attorney, Agent, or Firm*—Poms, Smith, Lande & Rose

[57] ABSTRACT

A method and apparatus for preparing essentially fat free chips such as potato chips and the like having an appearance and taste similar to conventional chips without the use of deep fat frying processes. The method of the present invention includes the steps of exposing sliced raw potatoes and the like to a high intensity microwave field that rapidly converts moisture within the slice into steam. These exposed slices are then dried by longer exposure to a lower energy microwave field. The apparatus of the present invention includes a single mode meander waveguide with a microwave absorptive terminator at an end of the waveguide to support a standing wave field within the waveguide. Apertures are provided along portions of the waveguide to accommodate a microwave-transparent conveyor belt through the waveguide for transporting the potato slices and the like through the waveguide. The crisp chip type food product produced by this method and apparatus has not had any fat added to the chip and is therefore low in calories though having the conventional texture and taste associated with deep fat fried chip foods.

16 Claims, 2 Drawing Sheets

PROCESS FOR PREPARING FAT FREE SNACK CHIPS

FIELD OF THE INVENTION

The present invention relates generally to a process and apparatus for preparing various kinds of chips without immersion in heated oil and, more particularly, to a fat free method for preparing potato chips.

BACKGROUND OF THE INVENTION

A variety of methods are known in the food preparation art for preparing snack foods such as potato chips and other forms of vegetable and grain chips such as corn or tortilla chips. Most of these methods, however, rely on cooking techniques in which the potato or other chip is immersed in a reservoir of hot oil for a period of time. Known as "deep fat" frying, the effect of this cooking process is to substantially reduce the water content of the potato slice while allowing some fat uptake. The moisture content of fresh potato slices is typically about 85% of the weight of the slice while "deep fat" fried potato chips commonly have a moisture content of less than 5% by weight. The deep fat frying process, however, also typically results in a finished potato chip having a fat content from about 30% to about 45% of the total weight of the finished chip.

The high fat content of conventionally prepared potato chips is considered undesirable by many people because of the increased caloric value and the relatively short shelf life of the resulting chip. The fat stored in a potato chip can become rancid after long term storage, imparting an undersirable odor and taste to the chip. A number of cooking methods have been developed in the past to reduce the fat content of potato chips and the like. U.S. Pat. No. 3,365,301 to Lipoma et al., for example, discloses a process for making fried chips by partially cooking potato slices in an oil bath at higher temperatures and for shorter periods of time than normally used in conventional oil immersion cooking processes, with a final cooking step employing electromagnetic heating, such as microwave heating. The higher temperature and shorter time period of the oil immersion portion of the Lipoma cooking process is believed to result in a final chip having a reduced fat content. This approach, however, does not eliminate the uptake of fat by the chip during the first step of the cooking process. Another approach, disclosed in U.S. Pat. No. 4,283,425 to Yuan et al., is to prepare potato chips by coating a raw potato slice with globular proteins and an optional layer of edible oil on top of the protein coating. The potato slice prepared in this fashion is then cooked by microwave heating. While eliminating the step of deep fat frying, the Yuan approach still produces a potato chip having an exterior coating of at least globular proteins. At column 3, lines 47-59 the Yuen patent states the protein coating is an essential element in successfully microwaving the potato slices. Use of microwave heating alone to prepare potato chips has previously been considered unsuitable because of gelatinization, a tendency of starches in the potato slice to coat the exterior surfaces of the slice and to form a gummy seal which hardens with further heating. The Yuen patent, for example, notes at column 2, lines 45-50 that efforts to remove more than 3% of the moisture content of a potato slice by microwave heating causes starch gelatinization.

Thus, there still exists a need for a method of preparing potato and like vegetable chips, as well as corn, tortilla and other grain chips, having both the taste and consistency of the widely known and broadly appreciated deep fat fried potato, corn and tortilla chips, but which are fat free or virtually fat free.

SUMMARY OF THE INVENTION

In broad terms the present invention concerns a method and apparatus for preparing potato, corn and other chips that is fast, economical and entirely free of any fat frying or oil coatings. The method of the present invention includes a first cooking step of exposing raw potato slices or other vegetable or grain slices to a very high intensity microwave field in order to rapidly convert a substantial portion of the moisture in the raw slice into steam. This intense microwave heating has the effect of puffing the slices and producing increased porosity and surface roughness. During this step the moisture content of potato slices can be reduced from an initial moisture content of about 80% of the weight of the potato slice to a final moisture content of about 20%. The potato slices are then subjected to a drying step, which can be a combination of low intensity microwaves and convective hot air heating to dry and crispen the puffed and roughened slices into completed chips.

In the preferred embodiment, slices of potatoes or other flat portions of appropriate vegetables, grains and the like are initially arranged in a single layer on a conveyer belt in a spaced apart relationship without contacting one another during the first high intensity microwave exposure step. During the subsequent drying and crispening step, however, the potato slices may be arranged in layers up to 4 inches thick. The potato slices may also be seasoned by conventional processes between the first cooking and second drying steps, if desired.

The apparatus of the present invention includes, for the cooking step, a conveyor belt structure for supporting the potato slices in a single layer and a single mode travelling wave microwave waveguide having a series of apertures through which the conveyor belt passes. The conveyor belt is of a microwave-transparent material such as polypropylene or Teflon coated fiberglass. A microwave terminator is also located at one end of the waveguide to maintain a substantially single mode of propagation within the waveguide. A second apparatus combining both hot air convective heating and lower energy multi-mode microwave heating is disposed at an output and of the conveyor belt for the second drying step.

The novel features of the present invention will be better understood from the following detailed description, considered in connection with the accompanying drawings. It should be understood, however, that the drawings are for purposes of illustration and description only and are not intended as a definition of the limits of the present invention.

DETAILED DESCRIPTION

The methodology of the present invention is suitable for the preparation of fat free chips made from a wide variety of vegetables, grains, fruit and the like which can be cut or otherwise formed into flat, generally thin slice-shaped portions. The present invention is especially adapted for the preparation of fat free potato chips. The various types of potatoes traditionally preferred for conventional deep fat frying chip processes may be employed in the practice of the present invention, as well as those varieties of potatoes that have normally been undesirable for deep fat frying, typically because of their higher sugar content. Frozen potato slices may also be employed. The present invention may be used to prepare chips from raw vegetables, potatoes and the like that have been cut into slices or, alternatively, vegetable, potato, corn or other grains may be ground into a dough or paste and then shaped into generally flat slice-shaped configurations for preparation into a chip. In this description, the term raw product slices shall mean any of the cut or formed slices comprising any of the items or materials described above. For clarity of explanation the present invention will be described in the context of preparing fat free potato chips. It should be understood, however, that the following description of the present invention is in no way intended to limit the invention to the preparation of potato chips alone.

Figure 1:
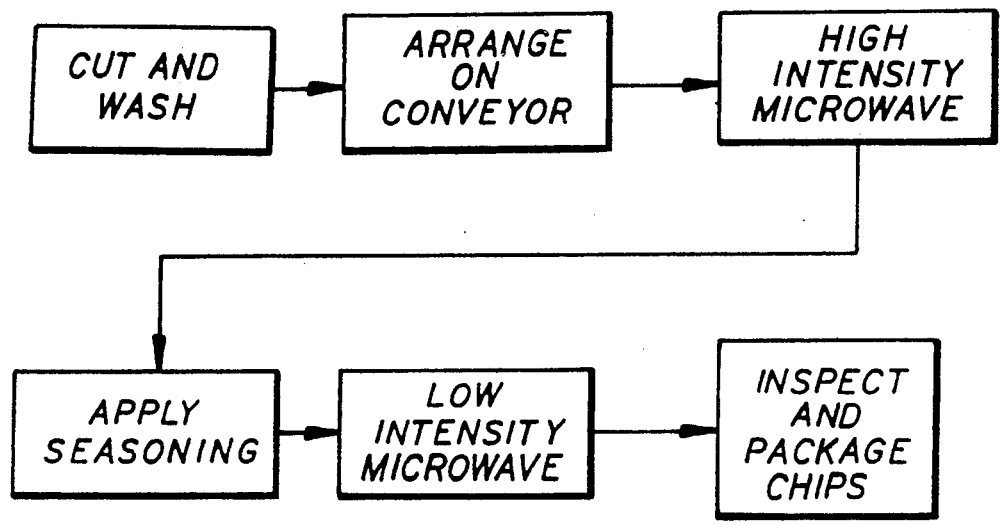
FIG. 1 is a flow chart of the method of the present invention.

Referring to the figures and, more particularly to FIG. 1, there is shown a flow chart of the method of the present invention. As shown, initial preparation of raw potato slices includes the steps of washing the raw potatoes and cutting them into slices. If desired, the potato may also be peeled prior to slicing, though peeling presently is not believed to be necessary. The potato slices may have thicknesses varying in a range dependent upon the desired thickness of the final chip. The thickness of the potato slice does not adversely affect the result of the microwave exposure cooking step. Typically, the potato slices are 1/16 inch thick. No surface coatings or layers are either required or desired on the exterior surfaces of the potato slices prior to the initial cooking step. Additionally, surface moisture need not be removed from the exterior surfaces of the potato slices. As shown in the flow chart of FIG. 1, the potato slices are first exposed to a very high intensity microwave field for a brief period of time to rapidly convert moisture within the potato slice into steam which escapes from the slice. These substantially dehydrated slices are then dried and crispened. In the preferred embodiment this drying step is accomplished by exposure to a combination of hot air and lower intensity microwave heating to produce a fat free chip having a moisture content of only a few percent by weight. The chips are then in final form, ready for any desired final inspection and packaging. As shown in FIG. 1, seasonings, such as barbecue flavoring, may be applied by spraying the puffed and roughened potato slices after the initial cooking step and before the final drying step.

The very high intensity of the initial microwave field is purposely selected to convert a major portion of the moisture within the potato slice into a heated vapor within a few seconds. While typically raw potato slices have a moisture content of approximately 80% weight, the initial exposure of the potato slices to the high intensity microwave field reduces the moisture content of the slices to about 20% by weight. Water vapor and steam occupy a substantially greater volume than the same quantity of water in liquid form. The rapid conversion into steam of the water within the potato slice has the effect of causing the potato slice to puff up. This steam also quickly escapes from the potato slice, having the effect of increasing the roughness and surface porosity of the slice. The increased surface porosity facilitates further dehydration of the potato slice and also provides a desirably roughened outer texture characteristic of traditionally deep fried potato chips.

It is believed the rapid conversion of a substantial portion of the moisture in the potato slice into steam and the violent departure of the steam from the potato slice prevents gelatinization, the formation and hardening of a starch layer on the exterior surfaces of the slice. The intensity of the microwave field to which the potato slices are exposed can be varied, along with the duration of the microwave exposure, to achieve the desired effect of preventing gelatinization by rapidly converting water within the potato slice into steam that swiftly escapes from the potato slice. Of course, the duration of microwave exposure must be increased as the intensity of the microwave field is decreased. It is presently believed that gelatinization can be avoided for microwave exposure periods lasting up to one and one-half minutes. After exposure to the high intensity microwave field, the puffed and roughened potato slices can then be dried into a chip without further concern for gelatinization. During the final drying step the moisture content of the potato slice is further reduced from of about 20% by weight to a final moisture content of about 2% by weight.

Figure 2:
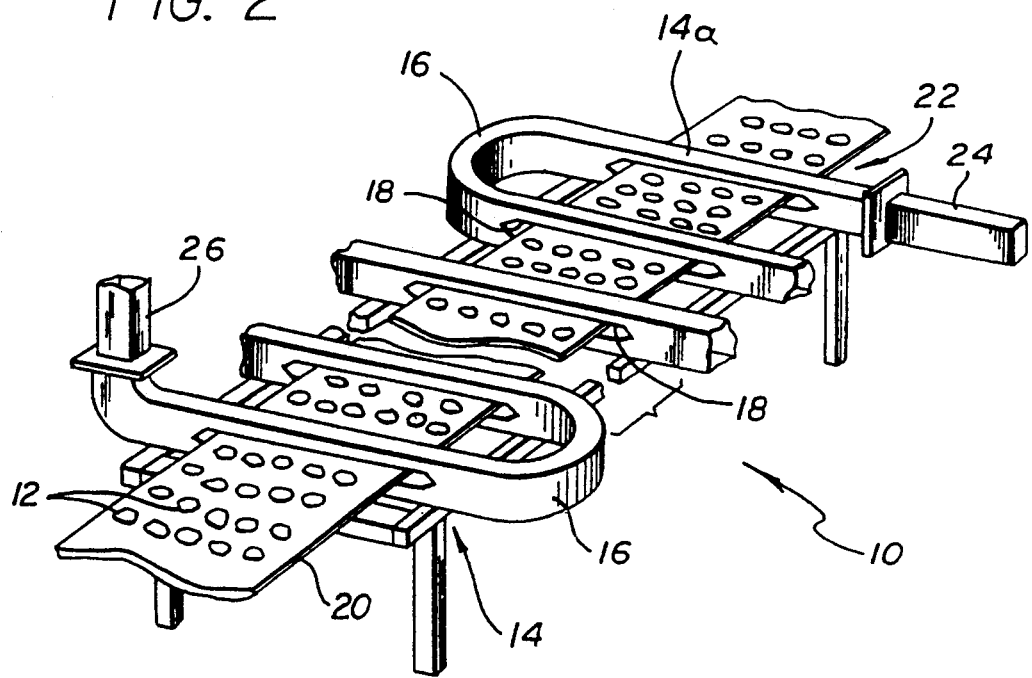
FIG. 2 is a perspective view of the apparatus of the present invention for subjecting potato, vegetable and grain slices to a high intensity single mode microwave field during the cooking step.

The initial cooking step of exposing the potato slices to a high intensity microwave field in order to puff and roughen the slices by rapidly reducing the moisture content can be achieved by a variety of ways. In the presently preferred embodiment, a travelling wave microwave waveguide is employed along with a microwave-transparent conveyor belt to transport the potato slices through slots in the waveguide. Referring to FIG. 2, a preferred embodiment is shown having apparatus 10 suitable for exposing potato slices 12 to a suitably high intensity microwave field. The apparatus 10 includes a meander waveguide 14 through which a generally single mode microwave field propagates. The waveguide 14 doubles back on itself repeatedly through a series of 180 degree bends 16 and is provided with a series of long, narrow apertures 18 through which a conveyor belt 20 is disposed so as to transport the potato slices 12 through the multiple lengths of the waveguide 14. In the presently preferred embodiment, the waveguide 14 repetitively engages the conveyor belt 20 a total of twenty times, but only five straight-line lengths 14a of the waveguide 14 are shown in FIG. 1 for purposes of clarity. To facilitate formation of a single mode field within the waveguide 14, the end 22 of the waveguide 14 includes a water trap 24 to absorb substantially all of the microwave energy propagating through to the waveguide end 22. The number of straight-line portions 14a, of the waveguide 14 through which the potato slices 12 are carried is selected to optimize energy transfer from the microwave field within the waveguide 14 to the potato slices 12. Using the preferred embodiment having twenty straight-line waveguide portions 14a, approximately 80% of the initial microwave energy injected into the waveguide 14 is absorbed by the potato slices 12 as they are transported through the waveguide 14. A greater or lesser number of straight-line waveguide portions 14a could be selected if desired. Satisfactory microwave heating can be accomplished with the potato slices 12 travelling through as few as five straight-line waveguide portions 14a.

Figure 3:
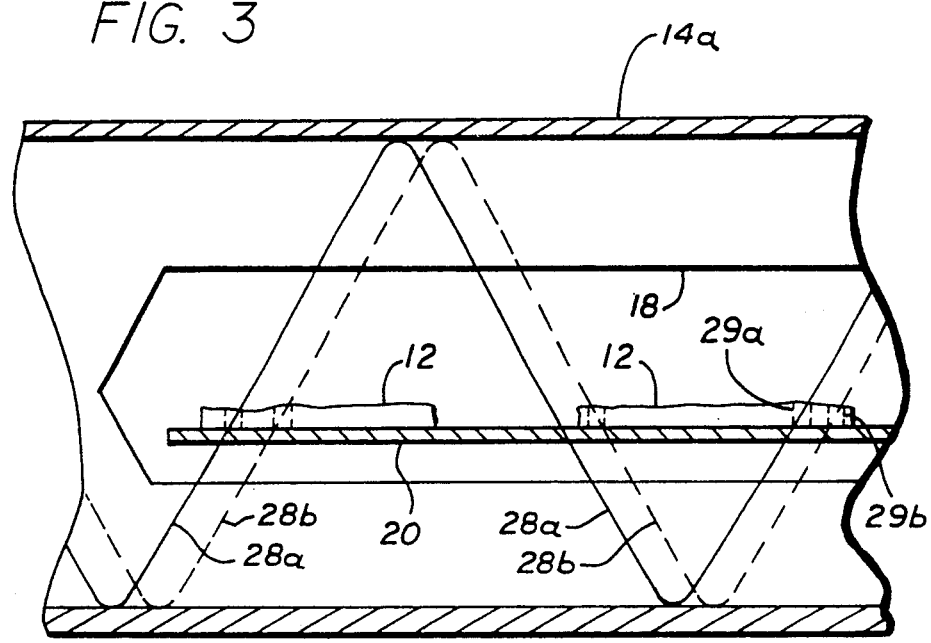
FIG. 3 is a side view of a single section of the microwave waveguide of the present invention.
Figure 4:
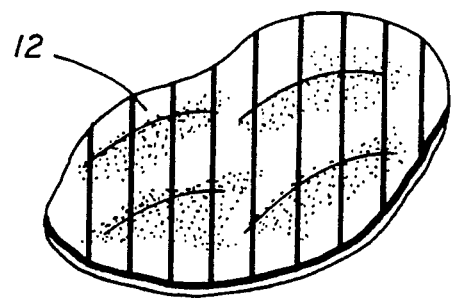
FIG. 4 is a persepctive view of a potato slice after exposure to a single portion of the microwave waveguide during the cooking step.
Figure 5:
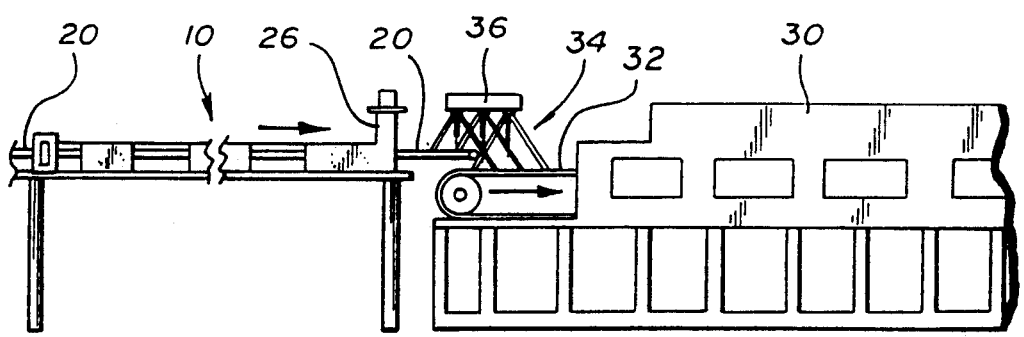
FIG. 5 is a perspective diagram of the apparatus of the present invention.

In the presently preferred embodiment, an input 26 to the waveguide is coupled to a microwave generator having a 60 kilowatt power output at 915 megahertz. The cross-sectional dimensions of the waveguide 14, selected to optimize microwave transmission at this frequency, are the standard dimensions of a waveguide bearing the mil.spec. designation WR9.75, that is 9.75 inches by 4.875 inches. The energy density at the waveguide input 26 can thus generally be characterized as approximately 1.25 kilowatts per square inch. Other frequencies within the microwave band of the electromagnetic spectrum could be employed, if desired. Discontinuities in the waveguide 14 such as the apertures 18, edges of the conveyor belt 20 and the potato slices 12 cause a standing wave pattern to form within the waveguide 14. As shown in FIG. 3, as a potato slice 12 is carried through a straight-line portion 14a of the waveguide a standing wave pattern 28a causes only localized heating in a region 29a of the potato slice 12. Thus, after exposure to a first straight-line section of the waveguide 14, the potato slice 12 will have a generally "stripped" appearance as illustrated in FIG. 4. Each of the waveguide turns 16 is therefore configured to induce a shift in the position of the standing wave pattern within the straight-line section 14a of the waveguide 14 with respect to the conveyor belt 20, as illustrated in FIG. 3 by the standing wave pattern 28a and localized heated region 29a within the straight-line waveguide 14a shown relative to the position of a prior or subsequent standing wave pattern 28b disposed within an adjacent straight-line waveguide section (not shown). This displacement of the standing wave pattern 28a and 28b between adjacent straight-line waveguide sections 14a assures an even exposure of each potato slice 12 to microwave heating after the potato slice 12 has been conveyed through several straight-line waveguide sections 14a.

The composition of the conveyor belt 20 is selected to be essentially transparent to the microwaves propagating within the waveguide 14 and to avoid adhesion of the potato slices 12 to the belt 20. In the presently preferred embodiment, the conveyor belt 20 is made of polypropylene. Alternatively, however, the conveyor belt 20 could be made of Teflon coated fiberglass.

As previously mentioned, the duration of exposure of the potato slices 12 to the high intensity microwave field is fairly brief. In the presently preferred embodiment the conveyor belt 20 moves at a rate of 15-20 feet per minute while each straight-line section of the waveguide 14 has a width of 4.875 inches, resulting in an exposure time of 1.25-1.66 seconds for the potato slices 12 each time the potato slices pass through a straight-line section 14a of the waveguide 14. In a system employing 20 straight-line waveguide sections 14a, the total exposure time for each potato slice 12 would be approximately 25 to 33 seconds. As mentioned above, the desired intensity of the microwave field can be varied immensely with the duration of exposure, so long as the field intensity is sufficient to convert moisture within the raw potato slice into steam rapidly enough to prevent formation and hardening of a starch layer. Thus power levels other than 60 kilowatts could be coupled to the waveguide input 26 to puff the potato slice and roughen its exterior surface so long as the rate of travel for the conveyor belt 20 is properly increased or decreased. Power levels as low as 25 kilowatts with associated input energy densities as low as 630 watts per square inch have been successfully used to prepare potato chips by the method and apparatus of the present invention.

Because a large amount of moisture escapes from the potato slices 12 during exposure to the high intensity microwave field, hot air convection can be employed to minimize condensation within the waveguide 14. Such condensation would decrease the amount of microwave energy available for transfer to the potato slices 12. In the preferred embodiment, hot air blowers (not shown) maintain the ambient temperature at and around the waveguide 14 at approximately 300° F. The hot air blowing through the waveguide 14 also contributes to the dehydration of the potato slice during this first cooking step. Other anti-condensation schemes can, of course, be employed. For example, lower temperature air movement could be employed along with electrical heating of the waveguide 14.

After exposure to the high intensity microwave field so as to puff the potato slices and roughen their exterior surface texture, further processing of the slices is still required to dry them into potato chips. This final drying step can be advantageously accomplished by a low power multi-mode microwave drying unit. In the presently preferred embodiment suitable for preparing potato chips, a conventional microwave baking unit model No. IV-60, available from MICRODRY INC. of Crestwood, Ky., is employed. This unit is typically 48 feet long and includes a microwave-transparent conveyor belt which is 6 feet wide. The conveyor belt is disposed between two perforated stainless steel plates disposed parallel to one another so as to form a multi-mode microwave cavity. Microwaves are injected into this cavity through two waveguides disposed along the top of the cavity with apertures communicating between the waveguide and the cavity. Normally four 60 Kilowatt microwave generators are coupled to the waveguide to provide a total power input of 240 kilowatt into the microwave cavity. The intensity of the microwave field within the MICRODRY baking unit, however, is significantly lower than the field intensity within the meander waveguide 14 because of the substantially larger size of the microwave cavity in the baking unit. Typically the energy density of the microwave field within the baking unit is on the order of 6 watts per square inch. This energy density is sufficient to dry the partially processed potato slices but would not cause the puffing and surface roughening that occurs in the microwave field exposure of the cooking step. In this description, the term low intensity microwave field means a field intensity that is insufficient to induce these effects.

During this final drying stage of the chip preparation process, the moisture content of the potato slices is reduced to a final amount of about 2% to 5% by weight. Typically the conveyor belt moves at a rate of ten to fifteen feet per minute, providing an exposure time for the potato slices of between about 3.2 and 4.8 minutes. Hot air is also injected into the microwave cavity at a temperature of about 180° to 200° F. at a rate of approximately 200 feet per minute. This hot air movement prevents condensation within the drying cavity and contributes to the final crispening of the chips. During this stage of the chip preparation process, the chips need not be arranged in a single layer to achieve satisfactory drying and, in the preferred embodiment, are arranged in layers approximately 4 inches deep.

Referring to FIG. 2, the MICRODRY baking unit 30 is shown adjacent the high intensity microwave apparatus 10. A conveyor belt 32 of the baking unit 30 may be disposed slightly underneath an output end 34 of the conveyor belt 20 to catch the potato slices 12 as they leave the microwave apparatus 10. If desired, spraying units 36 may be disposed at the output end 34 of the conveyor belt 20 to apply seasonings to the partially cooked potato slices before final drying. Such seasonings are typically employed to add "barbecued" and similar flavorings to the chip. The chips leaving the baking unit 30 are in final form, ready for any desired final inspection and subsequent packaging.

Application of the method and apparatus of the present invention to potato slices produces a potato chip having the well recognized texture, consistency and flavor of the traditionally deep fat fried potato chip, but lacking any added fat. Further advantages of the present invention includes an extended shelf life for the resulting chips as well as the elimination of certain chip preparation safety hazards commonly associated with working around large quantities of hot oil necessary for batch preparation of potato chips.

The following example illustrates an embodiment of the present invention:

EXAMPLE

Fresh raw Idaho Russet potatoes are first sliced, peeled and water washed. The raw potato slices are then placed on a polypropylene conveyor belt in a single layer. The potato slices are arranged to avoid contact with one another as so to avoid arcing when the potato slices are exposed to the high intensity microwave field. The polypropylene conveyor belt then transports the potato slices through a meander microwave waveguide having a 30 kilowatt input at 915 MHz. This waveguide includes five straight-line portions through which the potato slices are carried by the conveyor belt. The waveguide is approximately 4.875 inches wide and the conveyor belt travels at a speed of 18-20 feet per minute, resulting in an exposure time of 1.25 to 1.66 seconds each time the potato slices are conveyed through a straight-line section of the waveguide. The output from this initial conveyor belt is positioned at the input to a Model No. IV-60 microwave and hot air drying unit available from MICRODRY INC. of Crestwood, Ky. The drying unit includes a multi-mode microwave cavity having a 240 kilowatt input and transferring approximately 80% of this energy input into the potato slices. Hot air at 180° to 200° F. is transported through the baking unit at 200 cubic feet per minute. The drying unit is 48 feet long and transports the potato slices at a rate of 10 to 15 feet per minute, resulting in an exposure time of 3.2 to 4.8 minutes. Potato slices transported through the baking unit are layered approximately 3 to 4 inches thick. The resulting potato chips prepared in this fashion have an appearance and taste similar to potato chips prepared by deep fat frying in that their surface texture is roughened and the moisture content of the resultant chip is reduced to about 2 percent by weight without any oil or fat having been added to the chip.

While the present invention has been described with reference to the preparation of potato chips, other chips may similarly be prepared by the inventive method described above. Thus, for example, corn chips, torilla chips and the like can similarly be prepared by forming a corn meal dough into appropriately configured slices for transport through the high intensity microwave field. Those skilled in the art will appreciate that various substitutions, omissions, modifications and changes may be made in the method and apparatus of the present invention without departing from the scope or spirit thereof. Accordingly it is intended that the foregoing description be considered merely exemplary of the present invention and not a limitation thereof.

What is claimed is:

1. A process for making low fat chips from raw product slices, comprising the steps of:
    a cooking step including exposing the slices to a microwave field having sufficiently high intensity to puff the slices and increase the porosity of the exterior surfaces of the slices; and
    drying the slices.

2. The process of claims 1 wherein the product slices are raw potato slices and the resulting chips are potato chips.

3. The process of claim 2 whereby the moisture content of the potato slices is reduced to about 20% by weight during the cooking step.

4. The process of claim 2 wherein the raw potato slices are approximately 1/16th of an inch thick.

5. The process of claim 2 wherein the microwave field of the cooking step is a single mode field created by a microwave waveguide.

6. The process of claim 2 wherein the potato slices are subjected to the microwave field of the cooking step for as long as approximately one and one-half minutes.

7. The process of claim 2 wherein the microwave field of the cooking step has an energy density of at least 630 watts per square inch.

8. The process of claim 1 wherein the high intensity microwave field of the cooking step is a single mode field.

9. The process of claim 1 wherein the slices are arranged in a single layer in spaced apart relationship without contacting one another during the cooking step.

10. The process of claim 1 further comprising the step of applying a seasoning to the slices between the cooking step and the drying step.

11. A process for making potato chips comprising the steps of:
    exposing raw potato slices to a microwave field having a sufficiently high intensity to reduce the water content by weight of the slice to about 20% within one and one-half minutes; and
    subsequently drying the potato slices to form a chip.

12. The process of claim 11 wherein the step of drying the potato slices is performed by low intensity microwaves.

13. The process of claim 12 wherein the step of drying the potato slices further includes use of hot air convection heating.

14. A process for making potato chips comprising the steps of:

cutting raw potatoes into slices;

a cooking step of exposing the potato slices to a microwave field having an energy density of at least approximately 100 watts per square inch; and subsequently drying the potato slices to form a chip.

15. A product made by the process of first exposing a raw product slice to a microwave field having a sufficiently high intensity to puff the slice and increase its porosity and then drying the slice, so as to produce a chip without any added fat.

16. The chip of claim 15 wherein the slice is a potato slice and the resulting chip is an oil-free potato chip.

* * * * *